(12) United States Patent
Clausi et al.

(10) Patent No.: US 11,504,779 B2
(45) Date of Patent: Nov. 22, 2022

(54) CORE DRILL BIT

(71) Applicant: Hilti Aktiengesellschaft, Schaan (LI)

(72) Inventors: Donato Clausi, Buchs (CH); Marco Balter, Fedlkirch (AT); Manuel Gut, Groefis (AT); Thomas Kinkeldei, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 756 days.

(21) Appl. No.: 16/328,651

(22) PCT Filed: Sep. 21, 2017

(86) PCT No.: PCT/EP2017/073853
§ 371 (c)(1),
(2) Date: Feb. 26, 2019

(87) PCT Pub. No.: WO2018/055015
PCT Pub. Date: Mar. 29, 2018

(65) Prior Publication Data
US 2020/0391306 A1    Dec. 17, 2020

(30) Foreign Application Priority Data

Sep. 23, 2016    (EP) ..................................... 16190256

(51) Int. Cl.
*B23B 51/04*      (2006.01)
*B24D 5/06*      (2006.01)
*B28D 1/04*      (2006.01)

(52) U.S. Cl.
CPC ................ *B23B 51/04* (2013.01); *B24D 5/06* (2013.01); *B28D 1/041* (2013.01);
(Continued)

(58) Field of Classification Search
CPC . B23B 51/04; B23B 2251/12; B23B 2251/14; B23B 2251/207; B23B 2251/24;
(Continued)

(56) References Cited

U.S. PATENT DOCUMENTS 5,400,861 A    3/1995   Sheirer et al.
5,865,571 A *   2/1999   Tankala ................. B23B 51/04
                                                    451/542
(Continued)

FOREIGN PATENT DOCUMENTS

CN          1631592 A      6/2005
CN         101146648 A     3/2008
(Continued)

OTHER PUBLICATIONS

International Search Report of PCT/EP2017/073853, dated Dec. 12, 2017.

*Primary Examiner* — Eric A. Gates
*Assistant Examiner* — Paul M Janeski
(74) *Attorney, Agent, or Firm* — Davidson, Davidson & Kappel, LLC

(57) ABSTRACT

A core drill bit 1 includes a tubular shaft 12, a mounting platform 31 provided on a proximal end of the tubular shaft 12 for mounting the core drill bit on a power tool 26, and an annular cutting section 2 provided with abrasive cutting segments 3 arranged at a distal end of the tubular shaft 12. A first transponder 24 is provided at the distal end of the tubular shaft 12. A repeater 28 is provided comprising a second transponder 29 at the proximal end of the tubular shaft 12, an antenna 33 facing the first transponder 24, and a wired connection 34 between the antenna 33 and the repeater 28.

16 Claims, 3 Drawing Sheets

(52) U.S. Cl.
CPC ....... *B23B 2251/12* (2013.01); *B23B 2251/14* (2013.01); *B23B 2251/207* (2013.01); *B23B 2251/24* (2013.01); *B23B 2251/28* (2013.01); *B23B 2251/50* (2013.01); *B23B 2270/32* (2013.01); *B23B 2270/36* (2013.01)

(58) Field of Classification Search
CPC ............ B23B 2251/28; B23B 2251/50; B23B 2270/32; B23B 2270/36; B24D 5/06; B28D 1/041; B28D 7/005; B23Q 3/15546; G05B 2219/493
See application file for complete search history.

(56) References Cited

U.S. PATENT DOCUMENTS

| | | | |
|---|---|---|---|
| 7,210,878 | B2 | 5/2007 | Koslowski et al. |
| 10,639,756 | B2 * | 5/2020 | Hackman ............ B23F 23/1237 |
| 10,896,363 | B2 * | 1/2021 | Haimer ................ G06K 19/04 |
| 2001/0052416 | A1 | 12/2001 | Wissmach et al. |
| 2002/0167418 | A1 | 11/2002 | Goswami et al. |
| 2004/0253064 | A1 * | 12/2004 | Koslowski ............ B28D 1/041 |
| | | | 408/1 R |
| 2006/0103535 | A1 | 5/2006 | Pahlaven et al. |
| 2006/0159533 | A1 * | 7/2006 | Zeiler .................... B25D 17/00 |
| | | | 408/226 |
| 2007/0020056 | A1 * | 1/2007 | Burdick ............. B23B 51/0473 |
| | | | 408/204 |
| 2009/0080990 | A1 | 3/2009 | McMurtry et al. |
| 2012/0275874 | A1 | 11/2012 | Richt et al. |
| 2013/0057387 | A1 * | 3/2013 | Binmore ............... E21B 17/006 |
| | | | 408/1 R |
| 2013/0306379 | A1 | 11/2013 | Chan et al. |
| 2014/0253131 | A1 | 9/2014 | Liu et al. |
| 2015/0343539 | A1 | 12/2015 | Hoop |
| 2017/0001249 | A1 | 1/2017 | Hoop |
| 2017/0274489 | A1 | 9/2017 | Baratta |

FOREIGN PATENT DOCUMENTS

| | | | |
|---|---|---|---|
| CN | 101160608 B | 10/2010 | |
| CN | 102756139 A | 10/2012 | |
| CN | 103747903 A | 4/2014 | |
| CN | 104889452 A | 9/2015 | |
| CN | 104955597 A | 9/2015 | |
| CN | 205254191 U | 5/2016 | |
| CN | 105934299 A | 9/2016 | |
| EP | 721820 A1 * | 7/1996 | ......... B23Q 3/15546 |
| EP | 1591182 A2 | 11/2005 | |
| EP | 2 886 230 A1 | 6/2015 | |
| JP | H06134610 | 5/1994 | |
| JP | H06134610 A | 5/1994 | |
| JP | 2002059377 A | 2/2002 | |
| JP | 2003014867 A | 1/2003 | |
| JP | 2011218487 | 11/2011 | |
| RU | 2553697 C2 | 6/2015 | |
| SU | 926223 A2 | 5/1982 | |
| WO | WO2006/009155 | 1/2006 | |
| WO | WO2006/066259 | 6/2006 | |
| WO | WO2016/025963 | 2/2016 | |

\* cited by examiner

CORE DRILL BIT

The present invention relates to a core drill bit having an annular cutting section with abrasive cutting elements.

BACKGROUND

A machine tool operating a core drill bit is described in U.S. Pat. No. 7,210,878. The core drill bit has an identification means on its side proximal to the machine tool. The machine tool can read the identifications means for setting optimum torque/speed-pairings.

A core drill bit with abrasive cutting segments is described in EP 2 886 230 A1. The core drill bit has a tubular shaft and a releasably mounted annular cutting section with abrasive cutting segments.

SUMMARY OF THE INVENTION

It is an object of the present invention to provide a drill bit including a tubular shaft, a mounting platform provided on a proximal end of the tubular shaft for mounting the core drill bit on a power tool, and an annular cutting section provided with abrasive cutting segments arranged at a distal end of the tubular shaft. A first transponder is provided at the distal end of the tubular shaft. A repeater is provided comprising a second transponder at the proximal end of the tubular shaft, an antenna facing the first transponder, and a wired connection between the antenna and the repeater. The annular cutting section can be replaceable. An information tag located at the replaceable annular cutting section can be read by a drill machine.

In a preferred embodiment, the transponder has a data storage having stored data including one or more of unique identifier for the annular cutting section, type identifier for the annular cutting section, height of unused abrasive cutting segments, operating parameters of the core drill bit.

In a preferred embodiment, the impedance of the repeater is matched with the impedance of the first transponder.

In a preferred embodiment, the second transponder consists of a passive second antenna. The core drill bit needs no power supply. The power is provided via an interrogating signal by the machine tool or a readout unit.

In an embodiment, the second transponder is provided with a power source. The second transponder may be provided with an amplifier. The second transponder may further comprise a signal convertor for converting radio signals having first carrier frequency into radio signals having a second carrier frequency, the second carrier frequency matching the carrier frequency of the first transponder. A low frequency transmission is more suited for readout of the tag at the annular cutting section. Communication channels at higher frequency are more suited to establish radio communications over distance and for transmitting data. The first carrier frequency can be in the range of 3 MHz to 30 MHz and the second carrier frequency can be in the range of 2 GHz to 5.0 GHz.

In a preferred embodiment, the annular cutting section is releasably mounted to the tubular shaft. The tubular shaft may have an inner sleeve and the annular cutting section has an outer sleeve which circumferentially covers the inner sleeve, the transponder being attached to the outer sleeve and facing the inner sleeve, the antenna being attached to the inner sleeve and facing the transponder.

In an embodiment, the mounting platform has a water inlet open to the receiving room of the tubular shaft.

BRIEF DESCRIPTION OF THE DRAWINGS

Exemplary embodiments of the present invention are described below with reference to the drawings. The drawings do not necessarily illustrate the exemplary embodiments to scale, but, rather, are depicted in schematic and/or slightly distorted form when this is useful for the explanation. With respect to additions to the teaching which are directly apparent from the drawings, reference is made to the relevant related art. In this regard it is noted that a variety of modifications and alterations regarding the form and the detail of a specific embodiment may be made without departing from the general concept of the present invention. The features of the present invention disclosed in the description, the drawings, and the claims may be important to the refinement of the present invention, taken alone as well as in any given combination.

In addition, any combination composed of at least two of the features disclosed in the description, the drawings, and/or the claims fall within the scope of the present invention. The general concept of the present invention is not limited to the exact form or the detail of the preferred specific embodiment illustrated and described below or is not limited to a subject matter which would be delimited in comparison to the subject matter claimed in the claims. For given dimension ranges, values within the stated limits are also intended to be disclosed as limiting values, and may be used and claimed as desired. For the sake of simplicity, the same reference numerals are used below for identical or similar parts or parts having an identical or similar function.

The terms proximal and distal are used to indicate the relative position along an axis with respect to a tool machine as point of reference. Proximal has the meaning of closer to the tool machine; distal has the meaning of more distant to the tool machine.

Figure 1:
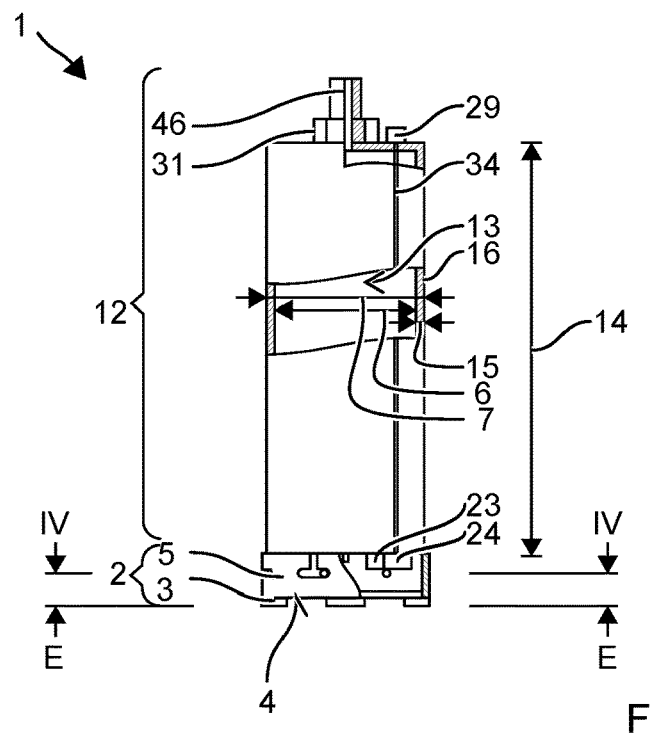

The Figures show:

FIG. 1 a drill bit having an exchangeable cutting section

Figure 2:
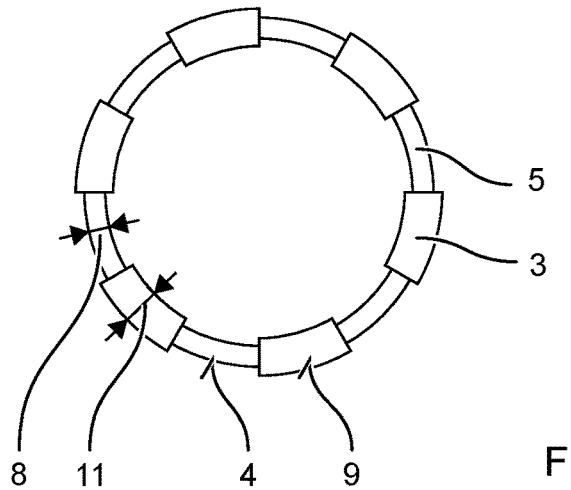

FIG. 2 a view from the bottom

Figure 3:
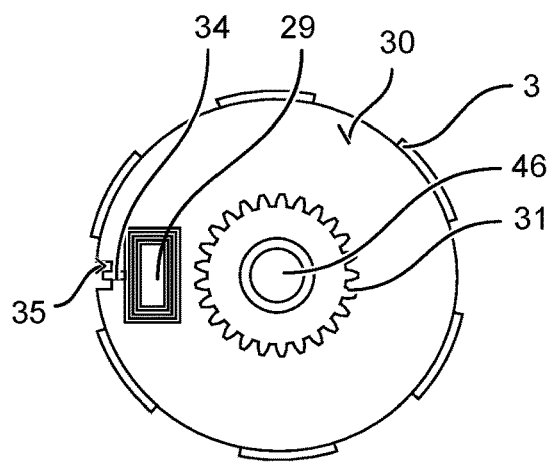

FIG. 3 a view from the top

Figure 4:
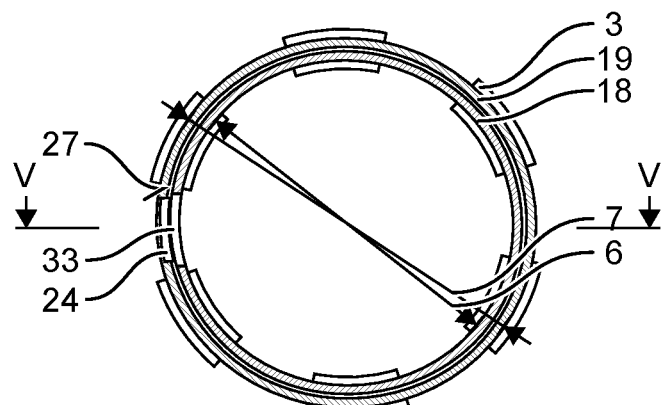

FIG. 4 a cross-section in the plane IV-IV

Figure 5:
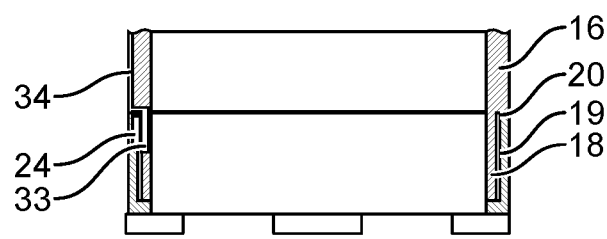

FIG. 5 a cross-section in the plane V-V

Figure 6:
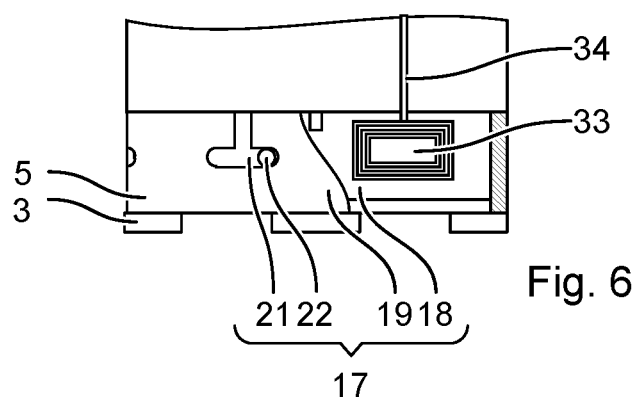

FIG. 6 a side view with a partially removed annular cutting section

Figure 7:
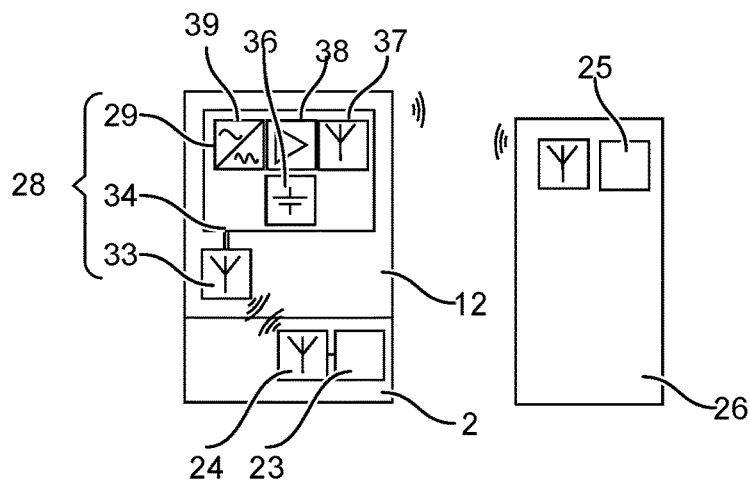

FIG. 7 a schematic view

Figure 8:
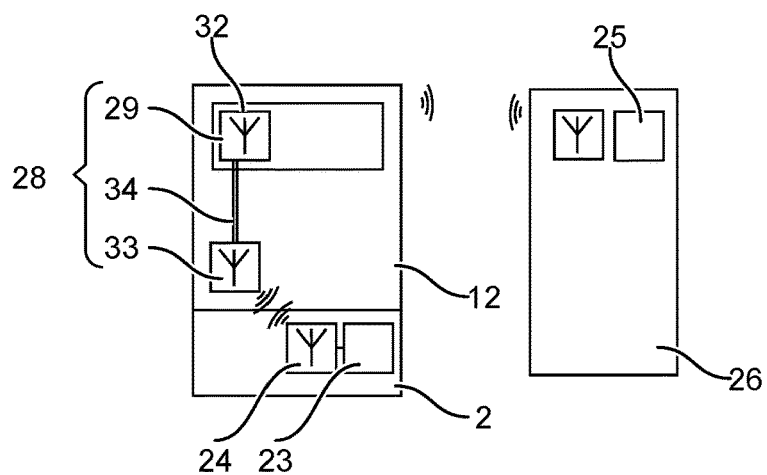

FIG. 8 a schematic view

Figure 9:
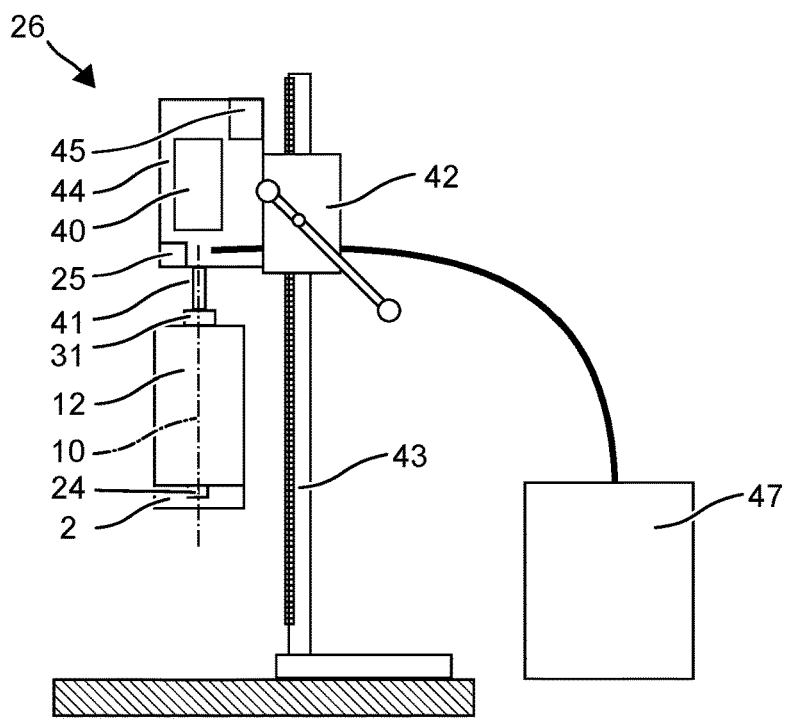

FIG. 9 the drill bit mounted to a machine tool.

DETAILED DESCRIPTION

Referring to the drawings, and initially to FIG. 1, there is shown a core drill bit 1 made in accordance with the invention. The core drill bit 1 is intended to make circular holes in walls, ceilings or similar structures made of concrete or other mineral materials. The core drill bit 1 demolishes the structure by grinding a ring-shaped hole leaving intact an inner cylindrical core.

The core drill bit 1 has annular cutting section 2 with one or several abrasive cutting segments 3 fixed to a distal abutting face 4 of a supportive body 5. The supportive body 5 is preferably a short and thin-walled cylindrical tube. A wall thickness of the supportive body 5 is significantly smaller than inner diameter 6 and outer diameter 7 of the supportive body 5. The wall thickness 8 is in the range of few millimeters; the diameters are larger than 2 cm, e.g. larger than 5 cm. The distal abutting face 4 is a circular ring of dimensions corresponding to the wall thickness and diameters. The abrasive cutting segments 3 are fixed to the distal abutting face 4 of the supportive body 5. Thus, the abrasive cutting segments 3 are arranged along the circumference of a circular ring.

A facet distal to the supportive body 5 is the active facet 9 which grinds the mineral structure. The active facet 9 is flat. The plane defined by the facet 9 is perpendicular to the longitudinal axis 10 of the core drill bit 1. The active facets 9 of all abrasive cuttings segments 3 are arranged in the same plane E. The active facets 9 may be curved within the plane E to match the curvature of the circular ring or shaped in order to optimize the grinding process. The abrasive cutting segments 3 may have a prismatic body shape. The thickness 11, i.e. radial dimension, of the abrasive cutting segments 3 is preferably by a margin larger than the wall thickness 8 of the supporting body 5. The supportive body 5 can emerge into the annular hole grinded by the abrasive cutting segments 3 without touching walls of the hole. The margin may be less than 5 mm, e.g. less than 2 mm.

The abrasive cutting segments 3 are preferably made of composite materials comprising very hard particles like diamond, synthetic diamond, and polycrystalline diamond embedded in a supporting matrix made of metal or ceramics. The hard particles have diameters in the sub-millimetre range up to a few millimetres. The hard particles may be arranged randomly or arranged in layers within the supporting matrix. The supporting matrix is worn of consecutively exposing fresh hard particles during use of the core drill bit 1. The annular cutting section 2 can hence be used until the abrasive cutting segments 3 are worn off entirely.

The annular cutting section 2 is preferably releasably mounted to a tubular shaft 12. The tubular shaft 12 has a cylindrical receiving room 13 of a height 14. The radial dimensions of the tubular shaft 12 are identical or almost identical to the radial dimensions of the annular cutting section 2. The tubular shaft 12 basically just extends the annular cutting section 2 along the longitudinal axis 10 and allows cutting holes as deep as the height 14 of the tubular shaft 12. The tubular shaft 12 requires being sturdy and therefore is preferably made from steel. A thickness 15 of its wall 16 of the tubular shaft 12 is chosen to sustain the pressure along the longitudinal axis 10 and the torque around the longitudinal axis 10. The wall thickness 15 of the tubular shaft 12 may be identical or almost identical to the wall thickness 8 of the annular cutting section 2. An inner diameter 6 and an outer diameter 7 of the annular cutting section 2 and the tubular shaft 12 are identical or almost identical. The wall thickness 15 is by a margin smaller than the thickness 11 of the abrasive cutting segments 3.

The annular cutting section 2 can preferably be mounted on and dismounted from the tubular shaft 12 such to be replaced by a new annular cutting section 2. A mechanical fastener mechanism 17 engages in a form fitting manner the annular cutting section 2 with the tubular shaft 12. The exemplary mechanical fastener mechanism 17 is based on a flanged bushing. The annular cutting section 2 is provided with an outer sleeve 18 at its proximal end. The tubular shaft 12 is provided with an inner sleeve 19 at its distal end. The inner sleeve 19 fits tightly into the outer sleeve 18. FIG. 1 shows just for illustrative purpose the outer sleeve 18 partly cut away such that the underlying inner sleeve 19 is visible. The inner sleeve and the outer sleeve are preferably cylindrical. An outer diameter of the inner sleeve 19 is about equal to the inner diameter of the outer sleeve 18. The outer sleeve 18 abuts along the longitudinal axis 10 against a flange or shoulder 20 (see FIG. 5) formed by the wall 16 of the tubular shaft 12. The inner sleeve 19 may equally abut against a shoulder formed by the supporting body 5, respectively. The inner sleeve 19 may be formed from the wall 16 by recessing the outer diameter. The inner diameter of the inner sleeve 19 and the wall 16 can be identical, and are in preference identical with the inner diameter of the annular cutting section 2. The outer sleeve 18 may be formed by recessing the supporting body 5 such to increase the inner diameter. The outer diameter may be left unchanged and identical to the supporting body 5 and in preference identical to the tubular shaft 12.

The mechanical fastener mechanism 17 (FIG. 6) can be provided with a bayonet-like lock. The bayonet-like lock is based on curved or tilted cams 21 open to one end into which pins 22 are engaged. In a portion close to the open end, the cams 21 guide the pins 22 predominantly along the longitudinal axis 10. In a further portion, the cams 21 guide the pins 22 predominantly around the longitudinal axis 10. The alteration of the initial longitudinal guidance and subsection rotational guidance secures the annular cutting section 2 against a disconnection along the longitudinal axis 10. The cams 21 can be implemented as slits or grooves. The illustrated example has the cams 21 on the outer sleeve 18 and the pins 22 on the inner sleeve 19. Different mechanical fastener mechanism are known, e.g. from EP 2 886 230 A1, which can be used to lock the annual cutting section 2.

The annular cutting section 2 is equipped with readable data storage 23. The readable data storage 23 may be read-only. The read-only data contains information about the cutting section 2. The data may be descriptive about the cutting section, e.g. height of the abrasive cutting segments before first use, number and dimensions of the abrasive cutting segments, material composition of the abrasive cutting segments, and diameter of the cutting section. The data may contain or be descriptive about optimal operation conditions or limiting operation conditions, e.g. optimal pressure, optimal rotational speed, optimal water flushing, maximum pressure, maximum rotational speed, minimal water flushing. The data may contain a type identifier of the annular cutting section. The type identifier is a sufficient pointer to look up data descriptive about the cutting section 2 or data descriptive about operation conditions for the cutting section in a separate lookup list. The data may contain an identifier unique for each cutting section 2. The unique identifier allows determining if the cutting section 2 has been replaced by any other cutting section, even by the same type. The readable data storage 23 may be read-only or allow for writing data. The writable data may include data about the last use, e.g. duration of use, applied torque and pressure, used tool machines.

The annular cutting section 2 has a transponder 24 connected with the data storage 23. The transponder 24 can read the data from the data storage and can transmit the data via a radio signal. An interrogating unit 25 sends a request via a radio signal to the transponder 24. The transponder 24 responds to the request by reading the data from the data storage and transmitting the data via the radio signal. The interrogating unit 25 is preferably part of the machine tool 26. The radio signals have a carrier frequency preferably higher than 3 MHz, and less than 30 MHz, for instance 13.6 MHz.

The transponder 24 is attached to annular cutting section 2. Preferably, the transponder 24 is mounted on the inner side 27 of the outer sleeve 18 such that the transponder 24 is at least partly encapsulated between the inner sleeve 19 and the other sleeve 18. The inner side 27 may be recessed to form a pocket for the transponder 24. (See FIG. 4) The metallic body of the core drill bit 1 shields the transponder 24 against mechanical damage, however, as well from directly receiving radio signals from the interrogating unit 25.

The transponder 24 is preferably a passive transponder. The annular cutting section 2 has no power source for powering the transponder 24 and the data storage 23. The transponder 24 is powered by the interrogating radio signals. The transponder 24 may have a capacitive power buffer collecting some energy from the radio signal sufficient for reading the data and transmitting the data. The transponder 24 and the data storage 23 may be an integrated unit. The integrated unit may be for instance an RFID device (radio-frequency identification). In particular, an RFID device being responsive to radio signals in one of the industrial, scientific and medical (ISM) radio bands.

The tubular shaft 12 has a repeater 28 for the radio signals. The repeater 28 receives the interrogating radio signals from the interrogating unit 25, passes the radio signals on to the transponder 24, and returns the response of the transponder 24 to the interrogating unit 25. The repeater 28 does not only transmit information via the radio signals but as well power to the transponder 24.

The repeater 28 is arranged on the tubular shaft 12. The repeater 28 has a separate transponder 29, herein called pre-transponder 29 to verbally distinguish over the transponder 24 with the data storage 23. The pre-transponder 29 is located on a proximal end of the core drill bit 1. Preferably, the pre-transponder 29 is arranged on a flat roof 30 of the tubular shaft 12 or on a mounting platform 31 (See FIG. 3). The pre-transponder 29 is visible from the outside of the core drill bit 1. The pre-transponder 29 may be in one embodiment a passive transponder consisting of a simple antenna 32. The antenna 32 may be made of several coils of conductor. The effective length of the coils is matched with the wavelength of the carrier frequency of the radio signals. The conductor may be wire, strip conductor printed on a polymeric foil, cardboard, etc.

The repeater 28 has a pick-up antenna 33. The pick-up antenna 33 is arranged in the vicinity of the transponder 24. Preferably, the pick-up antenna 33 is attached to the inner sleeve 18 of tubular shaft 12. The pick-up antenna 33 faces the transponder 24. The inner sleeve 18 may be recessed to provide for a pocket in which the pick-up antenna 33 is located. The pick-up antenna is made of several coils of conductor. The effective length of the coils is matched with the wavelength of the carrier frequency of the radio signals. The conductor may be wire, strip conductor printed on a polymeric foil, cardboard, etc. The pick-up antenna 33 may be identical to the integral antenna of the transponder 24.

The repeater 28 has a wired connection 34 connecting the pre-transponder 29 with the pick-up antenna 33. The wired connection 34 may be a two-stranded wire. The wire extends from the pre-transponder 29 to the pick-up antenna 33. The wire extends from the proximal end of the drill core bit 1 to the distal end of the drill core bit 1. For example, the wire starts on the roof 30 and ends at the annular cutting section 2. The wire can be embedded in a groove 35 formed in the outside of the tubular shaft 12.

The impedance of the repeater 28 is matched with the impedance of the transponder 24 for a power-efficient radio coupling. The passive pre-transponder 29 picks up power from the radio signals received from the interrogating unit 25. This power is forwarded to excite the pick-up antenna 33 such to emit repeat the radio signal. The transponder 24 is ultimately powered by this radio signal emitted by the pick-up antenna 33.

In one embodiment (FIG. 7), the pre-transponder 29 may be active and comprises a power source 36. The power source 36 may be a battery. The active pre-transponder 29 has an internal antenna 37. Signals received by the antenna 33 may be amplified by an internal amplifier 38 of the pre-transponder 29. The amplifier 38 may be directly connected to the pick-up antenna 33 via the wired connection 34, i.e. no further active electronic elements are arranged between the amplifier 38 and the pick-up antenna 33. The amplifier 38 increases the signal strength of the radio signal and indirectly powers the transponder 24.

In one embodiment (FIG. 8), the pre-transponder 29 may be active and comprises the power source 36. The active pre-transponder 29 has signal convertor 39. The embodiments described above pass on the interrogating radio signals without altering or processing the radio signals, apart from signal strength. The signal convertor 39 uses first radio signals for communicating with the transponder 24 and second radio signals for communicating with the interrogating unit 25 of the machine tool 26. The first radio signals may use a carrier frequency of about 2.5 GHz. The communication may be for instance based on the IEEE 802.15.1 standard, commonly known by the trademark Bluetooth. The second radio signals may selected in a low frequency range, e.g.

The core drill bit 1 has a mounting platform 31 for mounting to a machine tool 26. The mounting platform 31 may comprise a gear wheel for transmitting torque to the core drill bit 1. The machine tool 26 provides for torque around a longitudinal axis 10 and for pressure along the longitudinal axis 10. An illustrative machine tool 26 has a rotary drive unit 40 driving a spindle 41. The mounting platform 31 can be releasably mounted to the spindle 41. Albeit smaller core drill bits 1 can operated by a hand help machine tool 26, larger core drill bits 1 require for a rig 42 to sustain torque and pressure. The rig 42 has a lifting structure 43 for raising and lowering the core drill bit 1 along the longitudinal axis 10. For instance, the lifting structure 43 is based on a rack and pinion lifting a housing 44 of the rotary drive unit 40 and the spindle 41. The lifting structure 43 can be manually operated or automatically operated. An operating unit 45 of the machine tool 26 can monitor or control the pressure applied to the core drill bit 1 along the longitudinal axis 10.

The mounting platform 31 has a water inlet 46 (See FIG. 3) for flushing the abrasive cutting segments 3 with water. The water inlet 46 is preferably arranged on the longitudinal axis 10 and extends into the receiving room 13. A water supply 47 can be connected to the water inlet 46. The water supply 47 can be controlled by the operation unit 45.

What is claimed is:

1. A core drill bit comprising:
   a tubular shaft;
   a mounting platform provided on a proximal end of the tubular shaft for mounting the core drill bit on a power tool;
   an annular cutting section provided with abrasive cutting segments arranged at a distal end of the tubular shaft;
   a first transponder also provided at the distal end of the tubular shaft;
   a repeater including a second transponder at the proximal end of the tubular shaft;
   an antenna facing the first transponder; and
   a wired connection between the antenna and the repeater.

2. The core drill bit as recited in claim 1 wherein a repeater impedance of the repeater is matched with a transponder impedance of the first transponder.

3. The core drill bit as recited in claim 1 wherein the tubular shaft is made of steel.

4. The core drill bit as recited in claim 1 wherein the second transponder includes a passive second antenna.

5. The core drill bit as recited in claim 1 wherein the second transponder is provided with a power source.

6. The core drill bit as recited in claim 1 wherein second transponder is provided with an amplifier.

7. The core drill bit as recited in claim 1 wherein the second transponder includes a signal convertor for converting radio signals having first carrier frequency into radio signals having a second carrier frequency, the second carrier frequency matching the carrier frequency of the first transponder.

8. The core drill bit as recited in claim 7 wherein the first carrier frequency is in the range of 3 MHz to 30 MHz and the second carrier frequency is in the range of 2 GHz to 5.0 GHz.

9. The core drill bit as recited in claim 1 wherein the annular cutting section is releasably mounted to the tubular shaft.

10. The core drill bit as recited in claim 9 wherein the tubular shaft has an inner sleeve and the annular cutting section has an outer sleeve circumferentially covering the inner sleeve, the first transponder being attached to the outer sleeve and facing the inner sleeve, the antenna being attached to the inner sleeve and facing the transponder.

11. The core drill bit as recited in claim 10 wherein the first transponder is at least partly encapsulated between the inner sleeve and the other sleeve.

12. The core drill bit as recited in claim 11 wherein an inner side of the outer sleeve is recessed to form a pocket for the first transponder.

13. The core drill bit as recited in claim 1 wherein the mounting platform has a water inlet open to a receiving room of the tubular shaft.

14. The core drill bit as recited in claim 1 wherein the first transponder has a data storage having stored data including one or more of a unique identifier for the annular cutting section, a type identifier for the annular cutting section, a height of unused abrasive cutting segments and operating parameters of the core drill bit.

15. The core drill bit as recited in claim 1 wherein the first transponder is connected to the tubular shaft via the annular cutting section.

16. The core drill bit as recited in claim 1 wherein the first transponder is a passive transponder.

* * * * *